(12) United States Patent
Gupta

(10) Patent No.: US 9,870,552 B2
(45) Date of Patent: Jan. 16, 2018

(54) DYNAMICALLY UPDATING EMOTICON POOL BASED ON USER TARGETING

(75) Inventor: Arpit Gupta, New Delhi (IN)

(73) Assignee: EXCALIBUR IP, LLC, New York, NY (US)

(*) Notice: Subject to any disclaimer, the term of this patent is extended or adjusted under 35 U.S.C. 154(b) by 1170 days.

(21) Appl. No.: 13/276,987

(22) Filed: Oct. 19, 2011

(65) Prior Publication Data

US 2013/0103766 A1    Apr. 25, 2013

(51) Int. Cl.
| | |
|---|---|
| *G06F 15/16* | (2006.01) |
| *G06Q 10/10* | (2012.01) |
| *H04L 29/06* | (2006.01) |
| *H04L 29/08* | (2006.01) |
| *G06Q 30/02* | (2012.01) |
| *H04L 12/58* | (2006.01) |

(52) U.S. Cl.
CPC ......... *G06Q 10/107* (2013.01); *G06Q 10/101* (2013.01); *G06Q 30/02* (2013.01); *H04L 29/06* (2013.01); *H04L 29/08072* (2013.01); *H04L 51/04* (2013.01); *H04L 51/08* (2013.01)

(58) Field of Classification Search
CPC .......................... H04L 29/08072; H04L 29/06
USPC .......................... 709/203, 220, 225; 705/7.29
See application file for complete search history.

(56) References Cited

U.S. PATENT DOCUMENTS

| | | | | |
|---|---|---|---|---|
| 7,874,983 B2* | 1/2011 | Zancho et al. | ................ | 600/300 |
| 7,895,049 B2 | 2/2011 | O'Sullivan et al. | | |
| 7,940,914 B2* | 5/2011 | Petrushin | ................ | G10L 17/26 |
| | | | | 379/265.06 |
| 8,266,227 B2* | 9/2012 | Lingafelt et al. | ............. | 709/206 |
| 8,442,424 B2* | 5/2013 | Socolof | ................ | G06Q 10/02 |
| | | | | 455/2.01 |
| 8,442,849 B2* | 5/2013 | Kantak et al. | ............... | 705/7.11 |
| 8,539,359 B2* | 9/2013 | Rapaport | ............... | G06Q 10/10 |
| | | | | 709/217 |

(Continued)

OTHER PUBLICATIONS

"Haar-like features," Wikipedia, the free encyclopedia, accessed May 17, 2011, 3 pages http://en.wikipedia.org/wiki/Haar-like_features.

(Continued)

*Primary Examiner* — Khanh Dinh
(74) *Attorney, Agent, or Firm* — James J. DeCarlo; Greenberg Traurig, LLP

(57) ABSTRACT

Embodiments are directed towards dynamically updating, in real-time, an emoticon pool of a user based on a current personal construct of the user. In one embodiment, real-time changes in the current personal construct of a user may result in a real-time update to the emoticon pool of the user, which can allow the user's emoticon pool to dynamically track the user's current personal construct. The current personal construct of a user may be determined by examining user targeted information associated with the user. In some embodiments, the user targeted information may include, but not limited to, static user information, dynamic user information, implicit user information, and/or dynamic external information. In one embodiment, a user's emoticon pool may be dynamically updated by modifying an appearance of one or more base emoticons in a base emoticon pool and/or one or more existing emoticons in the user's emoticon pool.

18 Claims, 9 Drawing Sheets

(56) References Cited

U.S. PATENT DOCUMENTS

| | | | | |
|---|---|---|---|---|
| 8,564,514 | B2* | 10/2013 | Yoshihara | G09G 3/3406 345/76 |
| 8,605,718 | B2* | 12/2013 | Hemar et al. | 370/386 |
| 9,425,974 | B2* | 8/2016 | Tucker | H04L 51/32 |
| 2003/0119531 | A1 | 6/2003 | Patton et al. | |
| 2004/0147814 | A1* | 7/2004 | Zancho et al. | 600/300 |
| 2005/0223328 | A1 | 10/2005 | Ashtekar et al. | |
| 2005/0248574 | A1 | 11/2005 | Ashtekar et al. | |
| 2006/0282503 | A1* | 12/2006 | Gwozdz | G06Q 10/107 709/206 |
| 2007/0173726 | A1 | 7/2007 | Kim et al. | |
| 2008/0020361 | A1 | 1/2008 | Kron et al. | |
| 2008/0214903 | A1* | 9/2008 | Orbach | G06Q 50/22 600/301 |
| 2008/0256040 | A1* | 10/2008 | Sundaresan et al. | 707/3 |
| 2008/0270541 | A1* | 10/2008 | Keener | H04N 7/15 709/206 |
| 2009/0052645 | A1* | 2/2009 | Bansal | H04L 12/1827 379/202.01 |
| 2011/0225021 | A1* | 9/2011 | Kantak et al. | 705/7.29 |
| 2012/0123811 | A1* | 5/2012 | Socolof | 705/5 |
| 2014/0161356 | A1* | 6/2014 | Tesch | H04L 51/063 382/196 |
| 2014/0161423 | A1* | 6/2014 | Tesch | H04N 9/79 386/285 |

OTHER PUBLICATIONS

"Apple—Mac OS X—What is Mac OS X—iChat," Apple.com, accessed May 4, 2011, 2 pages http://www.apple.com/macosx/what-is-macosx/ichat.html.

"More Ichat Effects," MacPoupou, accessed May 4, 2011, 4 pages http://ismileys.free.fr/moreichateffects.

World of Warcraft, http://en.wikipedia.org/w/index.php?title=World_of_Warcraft&printable=yes, pp. 1-16, Nov. 21, 2007.

Grand Theft Auto, http://en.wikipedia.org/w/index.php?title=/Grand_Theft_Auto_%28series%29, pp. 1-8, Nov. 21, 2007.

Office Communication for U.S. Appl. No. 11/948,190 dated Jul. 21, 2010.

Office Communication for U.S. Appl. No. 11/948,190 dated Oct. 27, 2010.

U.S. Appl. No. 12/886,482, filed Sep. 20, 2010.

* cited by examiner

DYNAMICALLY UPDATING EMOTICON POOL BASED ON USER TARGETING

TECHNICAL FIELD

The present invention relates generally to emoticons and, more particularly, but not exclusively to dynamically updating an emoticon pool based at least on current personal construct.

BACKGROUND

Instant messaging has become a commonly used application on the Internet. Instant messaging programs generally allow users to send and receive text-based messages. One typical shortfall of text-based messages is that they generally lack an emotional aspect. As a result, users sometimes convey their emotions and/or moods to another user by adding emoticons' to a text-based message. Generally, emoticons are icons (e.g. a smiley face) and/or a sequence of characters, typically appearing inline with text (e.g. ;-) (wink)). In some cases, a sequence of characters can be transformed into an icon that represents a similar emotion. In some environments, emoticons can be grouped into an emoticon pool that can allow a user to select emoticons for use in a text-based message.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
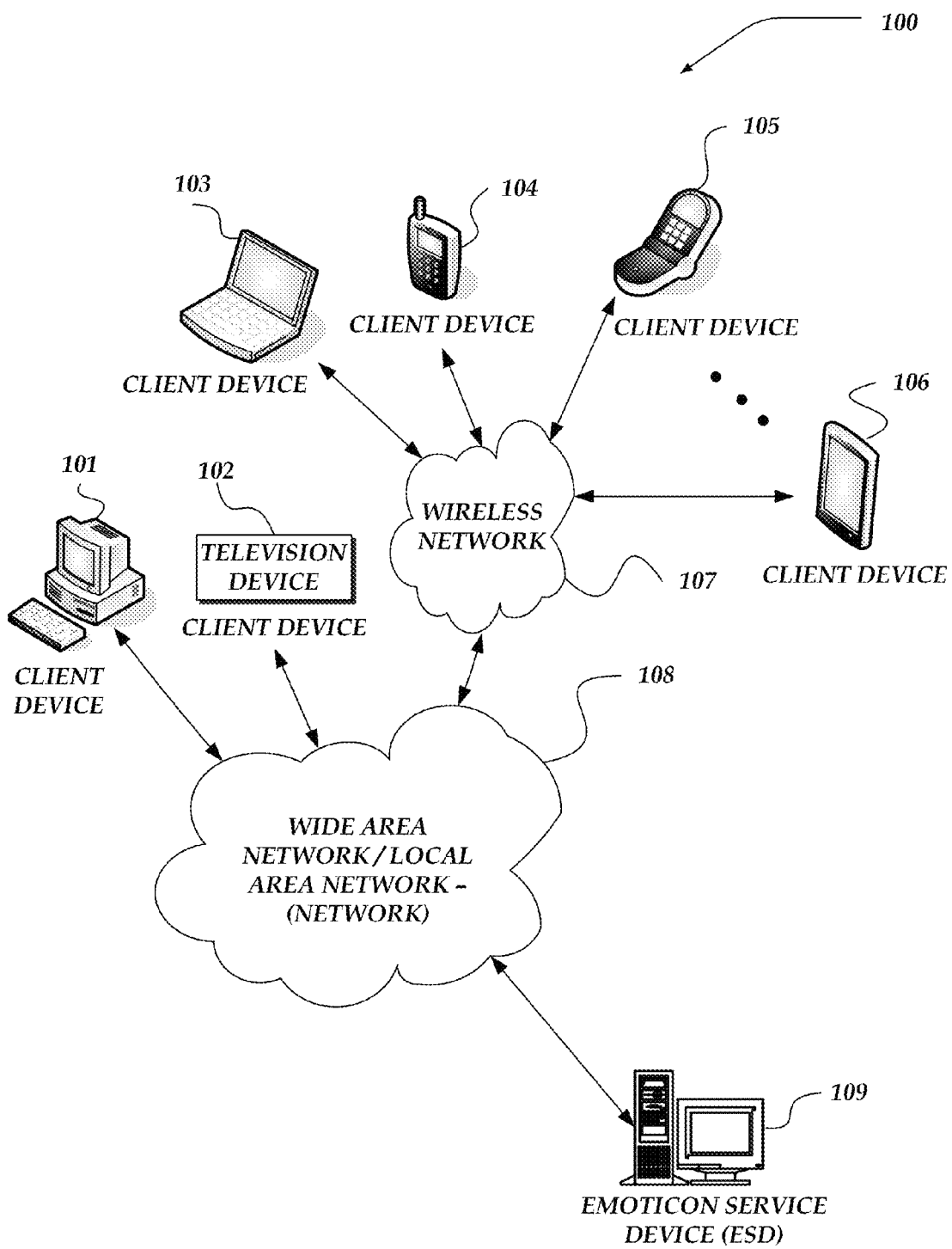
FIG. 1 is a system diagram of an environment in which embodiments may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the phrase "user targeted information" refers to any of a variety of information relating to a user. User targeted information may include, but not limited to, static user information, dynamic user information, implicit user information, dynamic external information determined to be relevant to the user, and/or any combination thereof. Static user information may include, but is not limited to, user profile, user preferences, user demographics, or the like. Dynamic user information may include, but is not limited to, a user's online activities, message content, a user's mood, or the like. Implicit user information may include, but is not limited to, a user's location, a user's social network trends, or the like. Dynamic external information may include, but is not limited to, weather, time of day, time of year, other calendar information, or the like.

As used herein, the phrase "current personal construct" refers to an abstract and/or general idea pertaining to a user that is inferred or otherwise derived from user targeted information. A current personal construct may provide an indication of, for example, a user's current interests, a user's current likes or dislikes, a user's recent and/or real-time online and/or offline activities, a user's mood, a user's physical environment, activities and/or ambiance surrounding a current holiday and/or festival determined to be relevant to the user (e.g. although it may be Christmas season, the user may not celebrate Christmas, but may celebrate Hanukkah, Eid ul-Fitr, or other religious holiday), or the like. A current personal construct may also include specific details, such as, for example, the user recently purchased a Nike hat, it is snow at the user's location, and it is the Christmas season.

As used herein, the term "emoticon attributes" refers to any of a variety of items that can be added to an emoticon. Emoticon attributes may include backgrounds, themes, sounds, animations, text, clothes, props, or other accessories.

As used herein, the term, "features" refers to any of a variety of aspects of an emoticon and/or emoticon attribute that can be modified. Features may include visual aspects (e.g. shape, size, color, orientation, text and/or fonts, or the like), audible aspects (e.g. volume, duration, playback, animation, or the like), or the like.

As used herein, the term "social network" refers to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards dynamically updating, in real-time, an emoticon pool of a user based on a current personal construct of the user. In some embodiments, a current personal construct may provide an indication of, for example, a user's current interests, a user's current likes or dislikes, a user's online and/or offline activities, a user's mood, a user's physical environment, activities and/or ambiance surrounding a current holiday and/or festival, or the like. In one embodiment, real-time changes in the current personal construct of a user may result in a real-time update to the emoticon pool of the user, which can allow the user's emoticon pool to dynamically track the user's current personal construct. In one, non-limiting, non-exhaustive example, if it is raining at the user's location, then the user's emoticon pool may include emoticons with umbrellas. However, if the weather changes to sunny, then the user's emoticon pool may be dynamically updated to remove the umbrellas and include emoticons with sunglasses.

The current personal construct of a user may be determined, in one embodiment, by examining user targeted information associated with the user. In some embodiments, the user targeted information may include, but not limited to, static user information, dynamic user information, implicit user information, dynamic external information, and/or any combination thereof. It is envisaged that any information targeted and/or related to a user can be utilized to determine a current personal construct of the user.

In one embodiment, the emoticon pool of a user may be dynamically updated by modifying an appearance of one or more base emoticons in a base emoticon pool, one or more existing emoticons in the emoticon pool of the user, or any combination thereof. In some embodiments, the appearance of an emoticon can be modified by adding one or more emoticon attributes to the emoticon, by modifying one or more emoticon and/or emoticon attribute features, or any combination thereof. In yet other embodiments, a user's emoticon pool may be dynamically updated to include a subset of base emoticons from a base emoticon pool. In one embodiment, the base emoticon pool may not change based on the current personal construct of the user, but the subset of base emoticons may be selected based on the user's current personal construct.

The dynamically updated emoticon pool may be provided to the user to enable the user to view the updated emoticon pool and to select an emoticon for insertion into a message.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 108, wireless network 107, client devices 101-106, and Emoticon Service Device ("ESD") 109.

One embodiment of client devices 101-106 is described in more detail below in conjunction with FIG. 2. Generally, however, client devices 103-106 may include virtually any portable computing device capable of receiving and sending messages over a network, such as network 108, wireless network 107, or the like. Client devices 103-106 may also be described generally as client devices that are configured to be portable. Thus, client devices 103-106 may include virtually any portable computing device capable of connecting to another computing device and receiving information. Such devices include portable devices such as, cellular telephones, smart phones, display pagers, radio frequency ("RF") devices, infrared ("IR") devices, Personal Digital Assistants ("PDAs"), handheld computers, laptop computers, wearable computers, tablet computers, integrated devices combining one or more of the preceding devices, and the like. As such, client devices 103-106 typically range widely in terms of capabilities and features. In one non-limiting example, a cell phone may have a numeric keypad and a few lines of monochrome liquid crystal display ("LCD") display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 101-106 may operate over wired and/or wireless network. Client device 102 may include virtually any device useable as a television device. Today, many of these devices include a capability to access and/or otherwise communicate over a network such as network 108 and/or even wireless network 107. Moreover, client device 102 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 101-106 also may include at least one other client application that is configured to receive and/or send messages and/or content, including instant messages, between another computing device. The client application may include a capability to send and/or receive emoticons associated with an instant message or other electronic message. In one embodiment, the emoticons may include media content, textual content, graphical content, audio content, or the like. The client application may further provide information that identifies itself, including a type, capability, name, and the like. In one embodiment, client devices 101-106 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, ESD 109, or other computing devices.

Client devices 101-106 may further be configured to include a client application that enables an end-user to log into an end-user account that may be managed by another computing device, such as ESD 109, or the like. Such end-user account, in one non-limiting example, may be configured to enable the end-user to compose a message and select one or more emoticons from a personal construct emoticon pool associated with the user to be inserted in the message. However, participation in such message and emoticon usage may also be performed without logging into the end-user account.

Wireless network 107 is configured to couple client devices 103-106 and its components with network 108. Wireless network 107 may include any of a variety of wireless sub-networks that may further overlay stand-alone ad-hoc networks, and the like, to provide an infrastructure-oriented connection for client devices 103-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 103-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, ESD 109, client devices 101 and 102, and through wireless network 107 to client devices 103-106. Network 108 is enabled to employ any form of computer readable media for communicating information from one electronic device to another. Also, network 108 can include the Internet in addition to LANs, WANs, direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of ESD 109 is described in more detail below in conjunction with FIG. 3. Briefly, however, ESD 109 may include any computing device capable of connecting to network 107 to dynamically update, in real-time, an emoticon pool associated with a user of client devices 101-106 based on a current personal construct of the user. Dynamically updating the emoticon pool is described in more detail below in conjunction with FIGS. 4-6.

In some embodiments, ESD 109 may also operate as website servers to provide content, including emoticons and emoticon pools, to client devices 101-106. Such content may include, but is not limited to textual, graphical, and/or audio content, and/or any of a variety of media content for access by, or any of a variety of other interactions with the media content by, another client device. ESD 109 may also operate as a messaging server such as a Short Message Service ("SMS") message service, Instant Message ("IM") message service, email message service, alert service, or the like. Moreover, ESD 109 may also operate as a File Transfer Protocol ("FTP") server, a database server, music and/or video download server, or the like. Additionally, ESD 109 may be configured to perform multiple functions.

Devices that may operate as ESD 109 include various network devices, including, but not limited to personal computers, desktop computers, multiprocessor systems, microprocessor-based or programmable consumer electronics, network PCs, server devices, network appliances, and the like.

Although FIG. 1 illustrates ESD 109 as a single computing device, the invention is not so limited. For example, one or more functions of ESD 109 may be distributed across one or more distinct network devices. Moreover, ESD 109 is not limited to a particular configuration. Thus, in one embodiment, ESD 109 may contain a plurality of network devices to dynamically update a user's emoticon pool. Similarly, in another embodiment, ESD 109 may contain a plurality of network devices that operate using a master/slave approach, where one of the plurality of network devices of ESD 109 operates to manage and/or otherwise coordinate operations of the other network devices. In other embodiments, the ESD 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
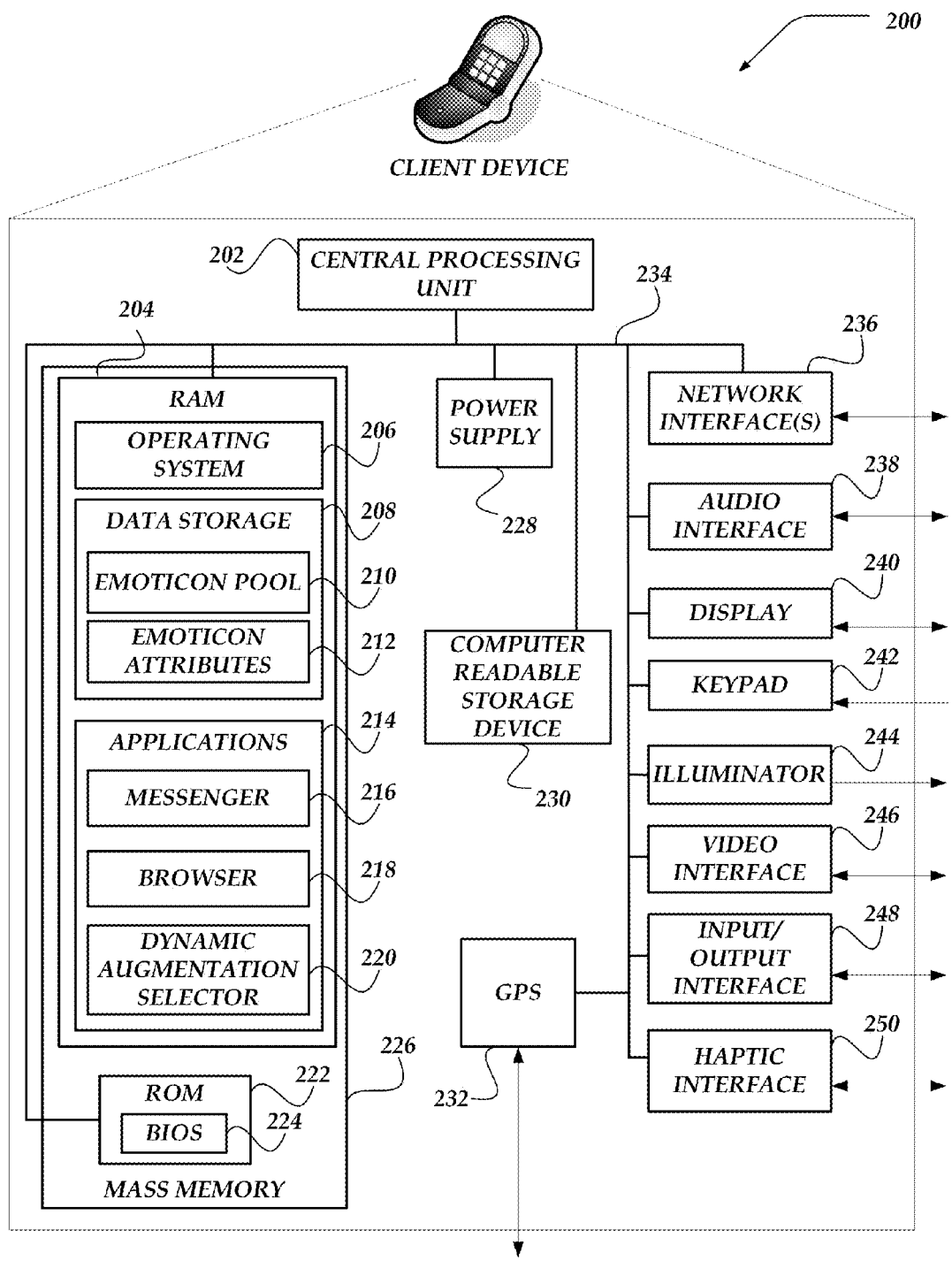
FIG. 2 shows an embodiment of a client device that may be included in a system such as that shown in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232. Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), SMS, GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

Data storage 208, in other embodiments, may further store emoticon pool 210 and/or emoticon attributes 212. Emoticon pool 210 may include a plurality of emoticons that can be selected by a user of client device 200 to be inserted in a message. As described in more detail below, emoticon pool 210 may be dynamically updated based on a current personal construct of the user. In some embodiments, emoticon pool 210 may include one or more emoticon pools associated with a user of client device 200 and/or a base emoticon pool. In one embodiment, emoticon pool 210 may be an optional component within client device 200. For example, the emoticon pool associated with the user may be hosted on another network device, such as network device 300 of FIG. 3, which may be accessible, in one embodiment, by client device 200.

Emoticon attributes 212 may include one or more emoticon attributes that can be added to one or more emoticons to modify an appearance of the emoticons. Emoticon attributes 212 may include logos, images, graphics, sounds, text, animations, and/or other digital content that can represent backgrounds, themes, clothes, props, or other accessories associated with an emoticon. In one embodiment, emoticon attributes 212 may be an optional component within client device 200. For example, the emoticon attributes may be hosted on another network device, such as network device 300 of FIG. 3, which may be accessible, in one embodiment, by client device 200.

Applications 214 may include computer executable instructions which, when executed by client device 200, transmit, receive, and/or otherwise process messages (e.g., SMS, Multimedia Message Service ("MMS"), IM, email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, messenger 216, browser 218, and dynamic augmentation selector ("DAS") 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to provide and/or receive messages between another computing device, such as another client device. Browser 218 may also be configured to enable a user to browse an emoticon pool, such as emoticon pool 210, and select one or more emoticons for insertion in a message.

Messenger 216 may be configured to manage a messaging session using any of a variety of messaging communications including, but not limited to email, SMS, IM, MMS, internet relay chat ("IRC"), Microsoft IRC ("mIRC"), Really Simple Syndication ("RSS") feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messenger 216 may be configured to include a mail user agent ("MUA") such as Elm, Pine, Message Handling ("MH"), Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like. Messenger 216 may also be configured to enable a user to browse an emoticon pool, such as emoticon pool 210, and select one or more emoticons for insertion in a message.

DAS 220 is configured to dynamically update an emoticon pool associated with a user, such as, in one embodiment, emoticon pool 210, based on a current personal construct of the user. In one embodiment, DAS 220 obtains and examines user targeted information to determine the user's current personal construct. DAS 220 may also, in one embodiment, be configured to accept feedback from a user of client device 200 to be used as additional user targeted information. In some embodiments, DAS 220 may dynamically update one or more emoticon pools of the user based on a subset of the user's current personal construct. In yet other embodiments, DAS 220 may be configured to select a subset of base emoticons from a base emoticon pool based on the user's current personal construct and augment the user's emoticon pool to include the selected subset of base emoticons.

DAS 220 may be configured to select one or more emoticons from an emoticon pool, generate a personal construct emoticon by modifying the selected emoticons, and update the emoticon pool with the personal construct emoticon. In some embodiments, DAS 220 may be configured to utilize emoticon pool 210 and/or an emoticon pool hosted on another device, such as emoticon pool 310 of FIG. 3. In some embodiments, each of the one or more emoticons may be selected and/or modified based on a subset of the user's current personal construct. In one embodiment, a different subset of the user's current personal construct may be utilized to select and/or generate different personal construct emoticons.

DAS 220 may, in some embodiments, be configured to modify an appearance of one or more selected emoticons. In one embodiment, DAS 220 may modify a selected emoticon by adding one or more emoticon attributes to the selected emoticon. In some embodiments, DAS 220 may utilize emoticon attributes 212 and/or emoticon attributes hosted on another device, such as emoticon pool 312 of FIG. 3. In other embodiments, DAS 220 may modify a feature of one or more selected emoticons and/or a feature of one or more emoticon attributes.

In one embodiment, DAS 220 may be an optional component within client device 200. For example, a dynamic augmentation selector hosted on another network device may be employed to perform the dynamic update of an emoticon pool associated with the user. In any event, DAS 220 may employ processes similar to those described below in conjunction with FIGS. 5-6 to perform at least some of its actions.

Illustrative Network Device

Figure 3:
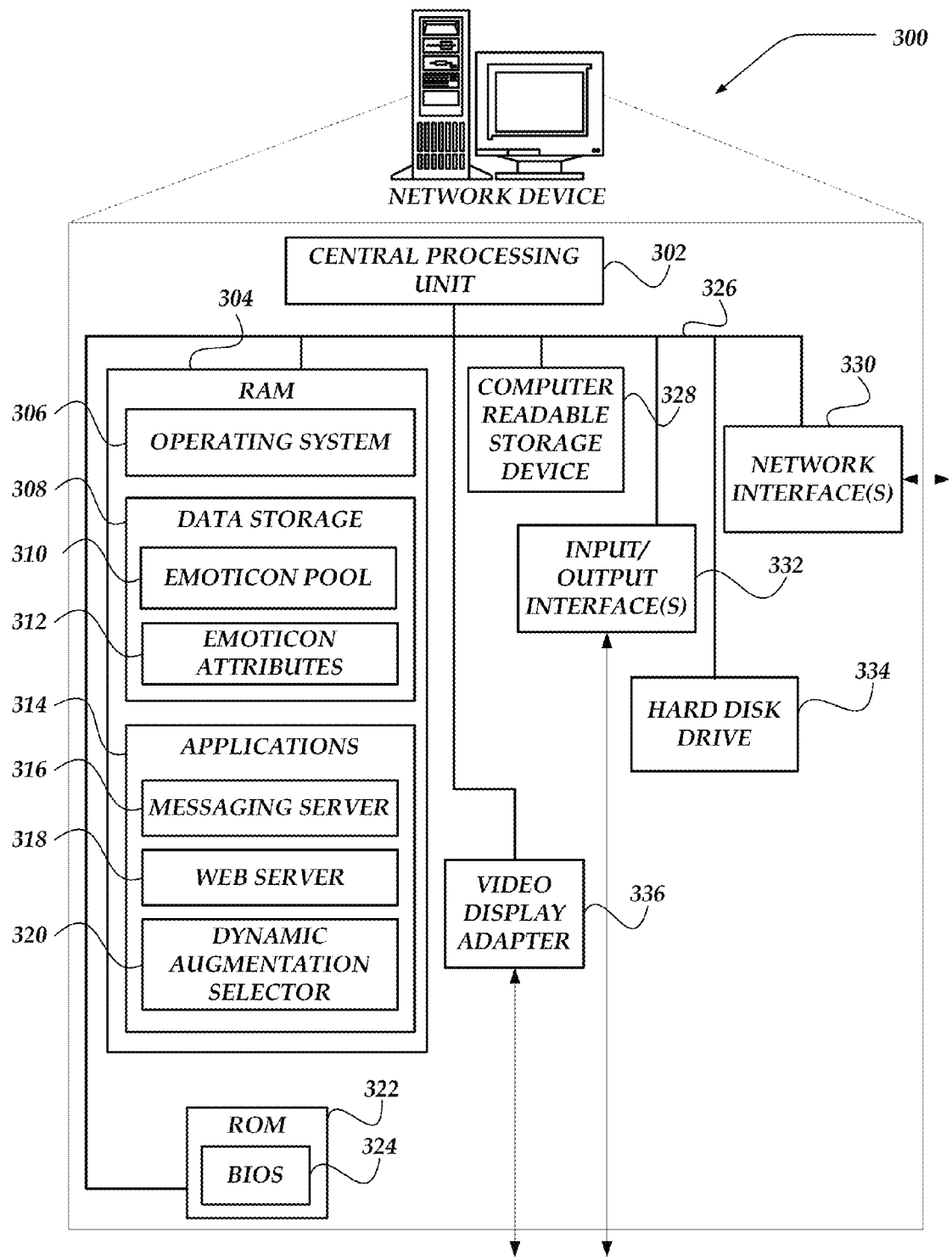
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example ESD 109 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or NIC.

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store emoticon pool 310 and/or emoticon attributes 312. Emoticon pool 310 may be configured substantially similar to emoticon pool 210 of FIG. 2, as described above. Emoticon attributes 312 may be configured substantially similar to emoticon pool 212 of FIG. 2, as described above. In some embodiments, emoticon pool 310 and/or emoticon attributes 312 may be optional components within network device 300. For example, the emoticon pool and/or the emoticon attributes may be hosted on another network device, such as client device 200 of FIG. 2, which may be accessible, in one embodiment, by network device 300.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Messaging server 316, web server 318, and dynamic augmentation selector ("DAS") 320, may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited, to Simple Mail Transfer Protocol ("SMTP"), Post Office Protocol ("POP"), Internet Message Access Protocol ("IMAP"), Network New Transfer Protocol ("NNTP"), or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VoIP sessions, or the like. In some embodiments, messaging server 316 may be configured to enable a user to access emoticon pool 310 (and/or emoticon pool 210 of FIG. 2) to select an emoticon and insert the selected emoticon in a message sent from the user.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Browser 318 may also be configured to enable a user to browse an emoticon pool, such as emoticon pool 310, and select one or more emoticons for insertion in a message.

DAS 320 operates substantially similar to DAS 220 of FIG. 2, as described above, to dynamically update an emoticon pool associated with a user based on a current personal construct of the user. However, in one embodiment, DAS 320 may be configured to operate over a plurality of communications between one or more network devices to dynamically update an emoticon pool.

In some embodiments, DAS 320 may be configured to utilize emoticon pool 310 and/or an emoticon pool hosted on a client device, such as emoticon pool 210 of FIG. 2. In other embodiments, DAS 320 may utilize emoticon attributes 312 and/or emoticon attributes hosted on client device, such as emoticon pool 212 of FIG. 2. For example, DAS 320 may, in one non-limiting embodiment, select one or more emoticons, such as a base emoticon, from emoticon pool 310. DAS 320 may, in one embodiment, modify an appearance of the selected emoticons by adding one or more emoticon attributes from emoticon attributes 312. DAS 320 may then dynamically update emoticon pool 210 of FIG. 2 with the selected and/or modified emoticons (i.e. personal construct emoticons). This example should not be construed as being limiting; rather, DAS 320 may be configured to utilize other combinations of emoticon pools and emoticon attributes from network device 300 and/or client device 200 of FIG. 2. In any event, DAS 320 may perform actions such as those described below in conjunction with FIGS. 5-6.

Illustrative User Targeted Information

Figure 4:
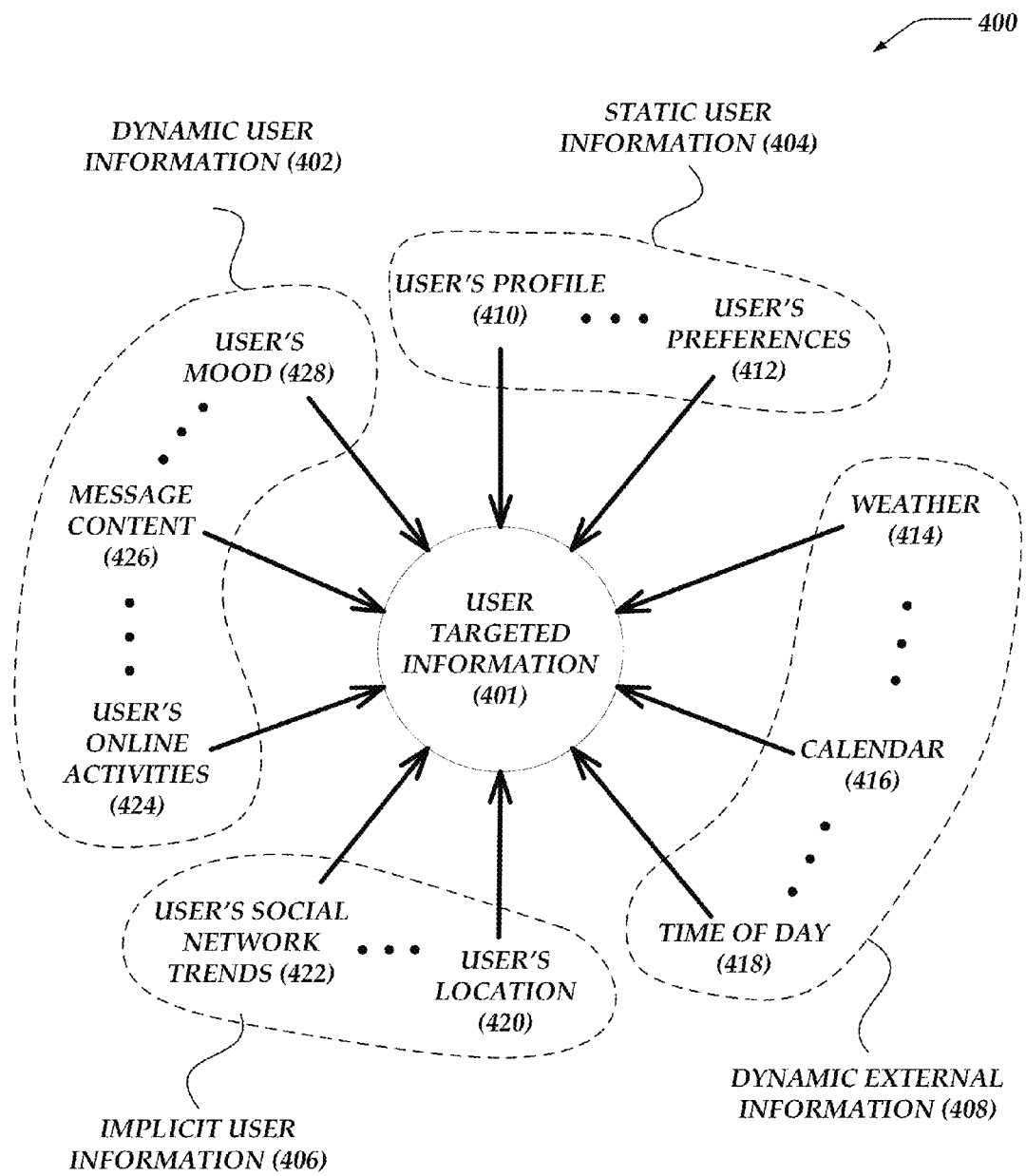
FIG. 4 illustrates a wheel diagram of a non-exhaustive example of an embodiment of user targeted information.

FIG. 4 illustrates one embodiment of user targeted information usable to generate a current personal construct for a user. It should be understood that diagram 400 is one illustrative example showing information that may be utilized as user targeted information and one skilled in the art would readily understand that other information related to a user may also be utilized as user targeted information. As illustrated, user targeted information 401 may include virtually any information relating to a user, such as, but not limited to, dynamic user information 402, static user information 404, implicit user information 406, dynamic external information 408, and/or the like. User targeted information 401 may include virtually any combination of information depicted in FIG. 4; other, non-illustrated, information that is related to the user; or any combination thereof.

Dynamic user information 402 may include dynamically changing information provided by the user and/or about the user. For example, dynamic user information 402 may include, but is not limited to, a user's online activities 424, message content 426, a user's mood 428, or the like. User's online activities 424 may include any online activities performed by the user, such as, but not limited to, online purchases, searches, browsing history, blogging, sharing user generated content, web page click through behavior, or the like. Message content 426 may include including text, emoticons, or other content of a message sent from and/or received by the user. User's mood 428 may be a mood or other status indicator of the user, such as, for example, a mood of an avatar of the user, a current social network mood of the user, or the like.

Static user information 404 may include information that is provided by the user and/or about the user that is unlikely to change over time, although it may. For example, static user information 404 may include, but is not limited to, a user's profile 410, a user's preferences 412, or the like. User's profile 410 may include any of a variety of personal information about the user, which may include, but is not limited to, age, gender, race, profession, religious affiliation, designated home location (e.g. home address), birth date, anniversary date, or the like. User's preferences 412 may include preferences and/or favorites of the user, such as, but not limited to, favorite websites, favorite color, favorite sports team, favorite celebrity, favorite store, favorite brand, group memberships, subscription information, or the like.

Implicit user information 406 may include information related to the user that can be used to infer other information about the user. Implicit user information 406 may include, but is not limited to, a user's social network trends 422, a user's location 420, or the like. User's social network trends 422 may include information inferred about a user based on friends of the user. For example, it may be inferred that a user is happy because social network trends 422 may indicate that a majority of the user's friends set their mood to happy. User's location 420 may include a physical location of the user, such as a location of client device 200 of FIG. 2. For example, it may be inferred that the user is on a boat because user's location 420 may indicate that the user is in the middle of a lake.

Dynamic external information 408 may include information from an external source that can change over time and is indirectly related to the user. For example, dynamic external information 408 may include, but is not limited to, weather 414, calendar 416, time of day 418, or the like. Weather 414 may include a current weather report at the user's location (such as by using user's location 420) that may be updated daily, hourly, minutely, or at any other suitable interval. Calendar 416 may include a variety of information relating to a calendar. For example, calendar 416 may include holidays, festivals, seasons, celebrations, and other events associated with a day, month, and/or time of year. Time of day 418 may include information related to a current time of day, such as, for example, it is morning, afternoon, evening, lunchtime, or the like.

As noted above, FIG. 4 illustrates one embodiment showing information that may be utilized as user targeted information. However, the invention is not so limited and other information that is related to a user may also be utilized as user targeted information.

General Operation

Figure 5:
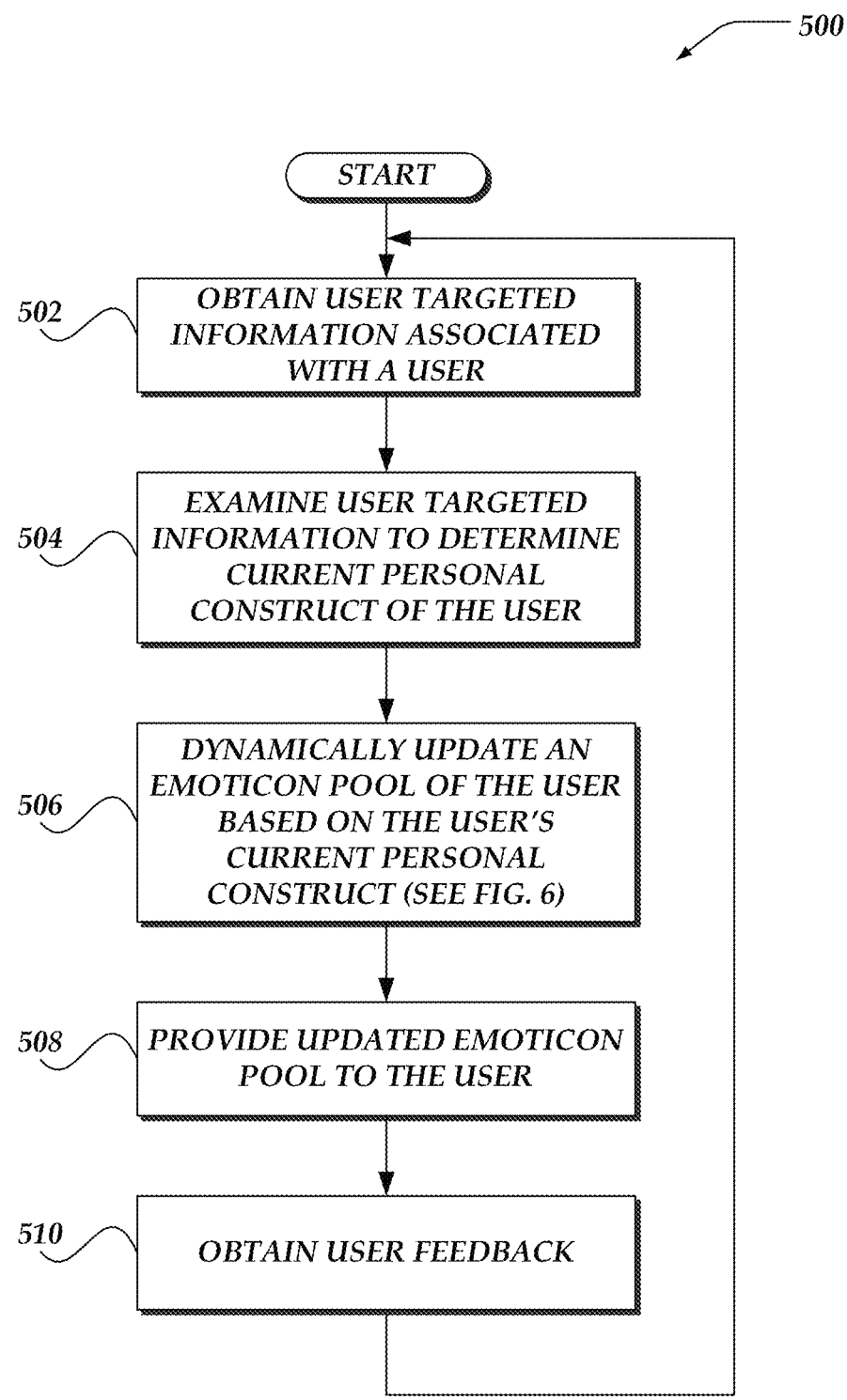
FIG. 5 illustrates a logical flow diagram generally showing one embodiment of an overview process for dynamically updating an emoticon pool of a user based on a current personal construct of the user.

The operation of certain aspects of the invention will now be described with respect to FIGS. 5 and 6. FIG. 5 illustrates a logical flow diagram generally showing one embodiment of an overview process for dynamically updating an emoticon pool of a user based on a current personal construct of the user. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where user targeted information associated with a user is obtained. The user targeted information may include user targeted information 401 of FIG. 4. User targeted information may be obtained from a plurality of sources.

In some embodiments, user targeted information may be obtained from the user. In one embodiment, user targeted information may be directly provided by the user and may include, for example, static user information 404 of FIG. 4, user's mood 428 of FIG. 4, feedback from the user on a previously updated emoticon pool, or the like. In another embodiment, user targeted information may be indirectly provided by the user and may include, for example, dynamic user information 402 of FIG. 4, implicit user information 406 of FIG. 4, or the like. In other embodiments, user targeted information may be obtained from an external source, such as, for example, a website, database, or the like and may include, for example, dynamic external information 408 of FIG. 4, user's social network trends 422 of FIG. 4, or the like.

User targeted information may, in some embodiments, be obtained based on user preferences, feedback from the user on a previously updated emoticon pool, or the like. In one embodiment, the user may be enabled to select which user targeted information may be obtained and/or what sources to utilize to obtain the user targeted information.

In some embodiments, user targeted information may be obtained in real-time as the user targeted information changes. In other embodiments, user targeted information may be obtained randomly or periodically, such as minutely, hourly, or any other suitable time interval. In one embodiment, if there is no change in the user targeted information, then process 500 may loop (not shown) to block 502 to obtain other user targeted information; otherwise, processing proceeds to block 504.

At block 504, user targeted information is examined to determine a current personal construct of the user. In one embodiment, a subset of the user targeted information may be examined. In some embodiments, the user targeted information may be examined automatically, independent of direct user initialization. In one embodiment, the automatic examination of the user targeted information may occur randomly, periodically, when the user targeted information changes, or the like. The examination of the user targeted information may be based on user preferences, feedback from the user on a previously updated emoticon pool, or the like. In some embodiments, user targeted information may be examined and a user's current personal construct may be determined in real-time as the user targeted information changes and/or is obtained. In one embodiment, if there is no change in the current personal construct, then process 500 may loop (not shown) to block 502 to obtain other user targeted information; otherwise, processing proceeds to block 506.

Examination of the user targeted information may, in some embodiments, include an evaluation of text associated with the user targeted information, a weighting of the user targeted information, or the like. In some embodiments, user targeted information text may be evaluated by, for example, but not limited to, evaluating a title, subject, header, tag, body, or the like of a web page visited by the user, message sent from and/or to the user, or the like. In another embodiment, other content associated with the user targeted information may be evaluated.

In other embodiments, user targeted information may be weighted based on a relevancy and/or currency factor of the user targeted information. In one embodiment, the currency factor may be based on when the user targeted information changed, such as, for example, user targeted information that changed more recently than other user targeted information may have a currency factor with higher weight than a currency factor of the other user targeted information. In another embodiment, the relevancy factor may be based on a comparison of different user targeted information. For example, a calendar may indicate that it is December, but the user's profile may indicate that the user is Jewish. As a result, user targeted information related to Christmas may have a relevancy factor with a lower weight than a relevancy factor of user targeted information related to Hanukkah.

In any event, process 500 continues continuing at block 506, which is described in more detail below in conjunction with FIG. 6. Briefly, however, at block 506, an emoticon pool of the user is dynamically updated based on the user's current personal construct. In one embodiment, dynamically updating the emoticon pool of the user may be performed automatically, independent of direct user initialization. In some embodiments, one or more user emoticon pools may be dynamically updated. In one embodiment, each of the one or more user emoticon pools may be dynamically updated based on a subset of the user's current personal construct.

Process 500 then proceeds to block 508, where the dynamically updated emoticon pool is provided to the user. In some embodiments, the dynamically updated emoticon pool may be provided to the user in real-time, randomly, periodically, or the like. In one embodiment, the emoticon pool may be dynamically updated in real-time based on real-time changes in the user targeted information and/or real-time changes in the user's current personal construct.

In some embodiments, providing the updated emoticon pool to the user may include displaying the updated emoticon pool to the user and/or downloading the updated emoticon pool to a client device of the user, such as client device 200 of FIG. 2. In one embodiment, one or more emoticon pools of the user may be selectively displayed to enable the user to select an emoticon from at least one of the one or more emoticon pools for use in a message.

Continuing to block 510, user feedback is obtained. In some embodiments, block 510 may be optional and may not be performed. User feedback may be explicit feedback and/or implicit feedback. Explicit feedback may include, for example, but not limited to, an accuracy of the updated emoticon pool, an indication whether the user liked and/or disliked the updated emoticon pool, or the like. Implicit feedback may include, in one non-limiting example, an indication of the emoticons selected and/or not selected by the user for use in a message.

In some embodiments, user feedback may be utilized as user targeted information. In other embodiments, user feedback may be utilized to determine what user targeted information to obtain and/or examined. In yet other embodiments, user feedback may be utilized to select and/or modify an emoticon.

In any event, process 500 then loops to block 502 to obtain other user targeted information.

Figure 6:
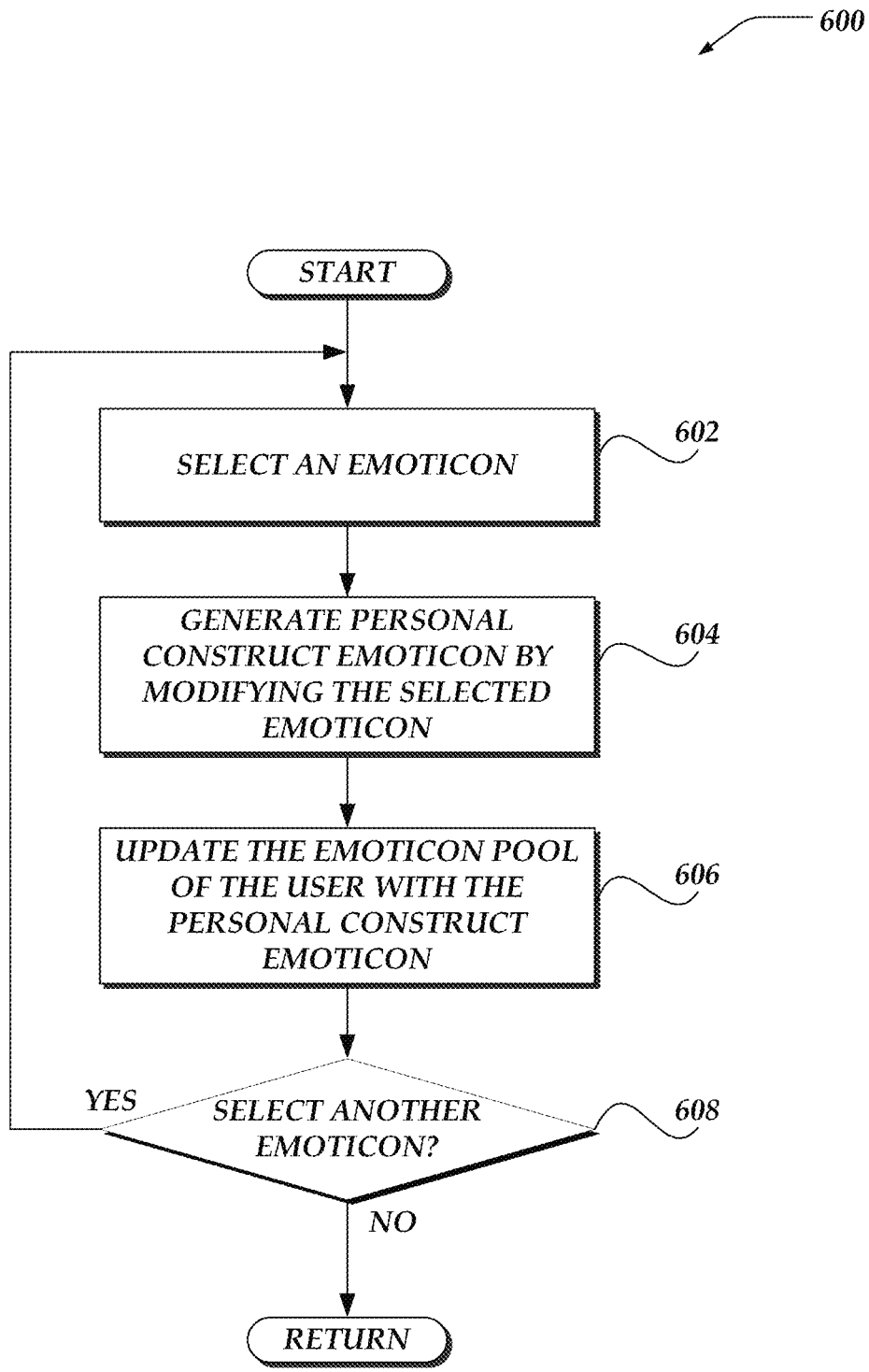
FIG. 6 illustrates a logical flow diagram generally showing one embodiment of a process for modifying one or more emoticons.

FIG. 6 illustrates a logical flow diagram generally showing one embodiment of a process for modifying one or more emoticons. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where an emoticon is selected. In some embodiments, the emoticon may be selected from a base emoticon pool that includes a plurality of base emoticons. In other embodiments, the emoticon may be selected from a user emoticon pool associated with the user that includes a plurality of emoticons.

In one embodiment, the emoticon may be selected based on a user's current personal construct, such as, for example, the current personal construct determined at block 504 of FIG. 5. In another embodiment, the emoticon may be selected based on a subset of the user's current personal construct. In yet another embodiment, the emoticon may be selected based on user feedback. In some embodiments, the emoticon may be selected based on a comparison of the user's current personal construct and one or more tags associated with the emoticon.

Continuing next to block 604, where a personal construct emoticon is generated by modifying the selected emoticon. In some embodiments, the selected emoticon may not be modified. In other embodiments, an appearance of the selected emoticon can be modified, such as, for example, modifying a feature of the selected emoticon, adding an emoticon attribute to the selected emoticon, modifying a feature of the emoticon attribute, or any combination thereof. In some embodiments, an appearance of the selected emoticon may be modified to mimic an avatar associated with the user. In one embodiment, an appearance of an emoticon in the emoticon pool of the user may be modified. In another embodiment, an appearance of a base emoticon from a base emoticon pool may be modified.

In some embodiment, a feature of the selected emoticon may be modified. In one embodiment, one or more visual aspects of the selected emoticon may be modified, such as, but not limited to, size, color, shape, orientation, text, or the like. In another embodiment, audible aspects of the selected emoticon may be modified, such as, but not limited to, a volume, duration, playback, animation, or the like. It should be understood that some emoticons may not have all of these features or may have additional features. As such, these features are examples, and other features or combination of features of the selected emoticon may be modified.

In other embodiments, one or more emoticon attributes may be added to the selected emoticon. In one embodiment, the one or more emoticon attributes may be selected based on the user's current personal construct. In another embodiment, each emoticon attribute may be selected from a subset of the user's current personal construct. In some embodiments, the emoticon attribute may be selected based on a comparison of the user's current personal construct and one or more tags associated with the emoticon attribute.

For example, if the user's current personal construct indicates that it is Christmas and sunny, one emoticon attribute that may be selected may be a Santa Claus hat because it is Christmas and another emoticon attribute that may be selected may be a pair of sunglasses because it is sunny. The resulting personal construct emoticon may have both the Santa Claus hat and the sunglasses. However, it should be understood that different subsets of the user's current personal construct may be utilized individually or in any combination to select the one or more emoticon attributes.

In some embodiments, a feature of the one or more emoticon attributes may be modified. In some embodiments, modifying the features of the emoticon attributes may be similar to modifying the features of the selected emoticon, as discussed above.

Process 600 next proceeds to block 606. At block 606, an emoticon pool of the user is updated with the personal construct emoticon. In one embodiment, the personal construct emoticon may be augmented to the user's emoticon pool. In another embodiment, the personal construct emoticon may replace or update an emoticon in the user's emoticon pool, such as, for example, when the emoticon utilized to generate the personal construct emoticon is selected at bock 602 from the user's emoticon pool.

In some embodiments, an advertiser may bid and/or purchase emoticons or emoticon attributes to be included in the dynamically updated emoticon pool. In one embodiment, the advertiser may be automatically billed if the purchased emoticon and/or emoticon attribute is included in a dynamically updated emoticon pool. In another embodiment, the advertiser may be automatically billed if a user selects the purchased emoticon and/or an emoticon with a purchased emoticon attribute for use in a message. For example, Brand A may bid on a hat emoticon attribute that includes Brand A's logo. Brand A may be billed one value if the hat is added to a personal construct emoticon that is augmented to a user's emoticon pool, and/or billed another value if the user selects the personal construct emoticon that includes the hat with Brand A's logo.

In any event, process 600 proceeds to decision block 608. At decision block 608, a determination is made whether or not to select another emoticon. In one embodiment, another emoticon may be selected based on a user preference indicating a total number of dynamically updated emoticons in the emoticon pool, such as, in one non-limiting example, between 10 and 50 emoticons. In another embodiment, another emoticon may be selected based on changes to the user's current personal construct. For example, an increase in a number of changes in the user's current personal construct can increase a number of emoticons selected to dynamically update the user's emoticon pool. In yet another embodiment, another emoticon may be selected based on a size of the user's emoticon pool. If another emoticon is to be selected, then processing loops to block 602; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

Figure 7:
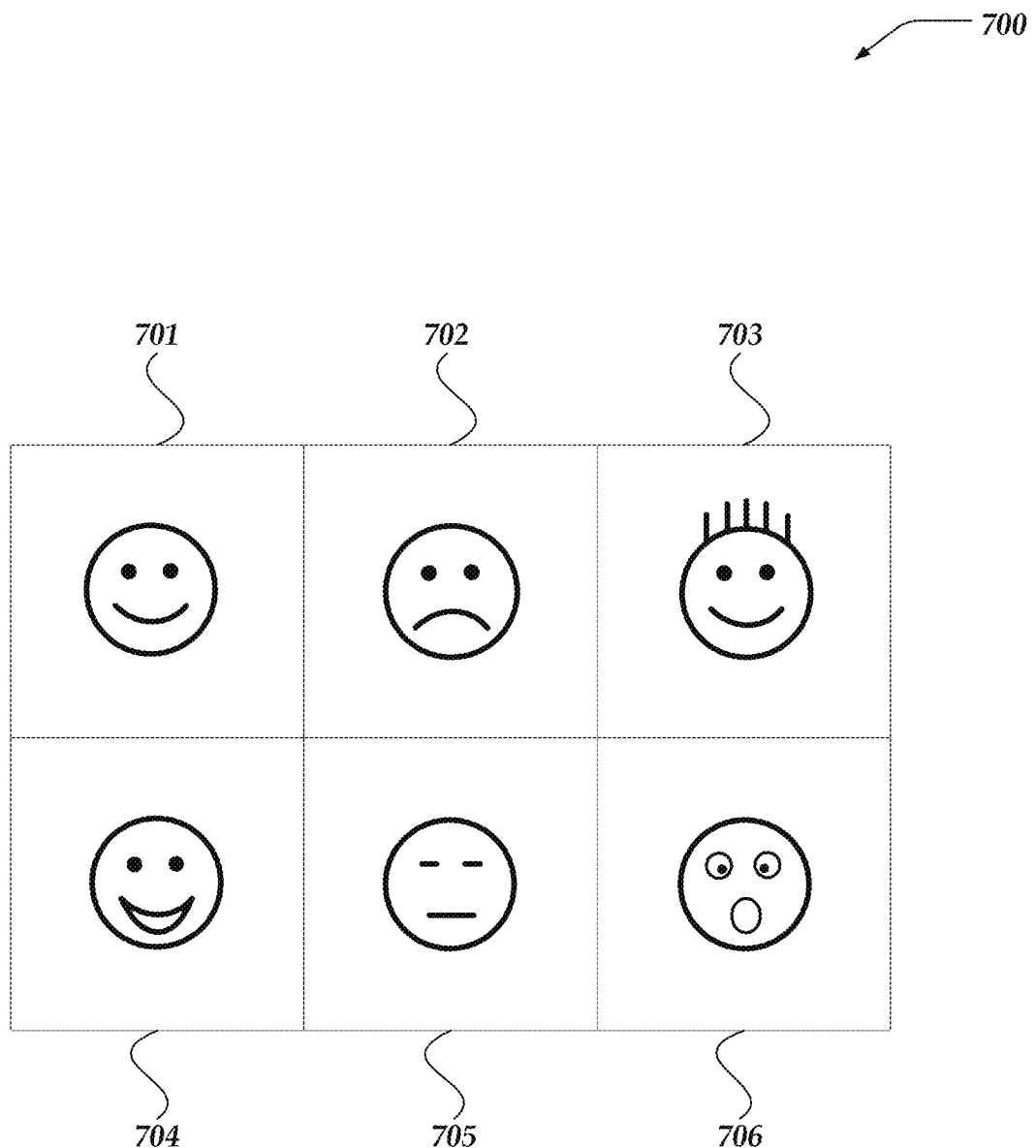
FIG. 7 shows a non-exhaustive example of a use case of an embodiment of a base emoticon pool.
Figure 8:
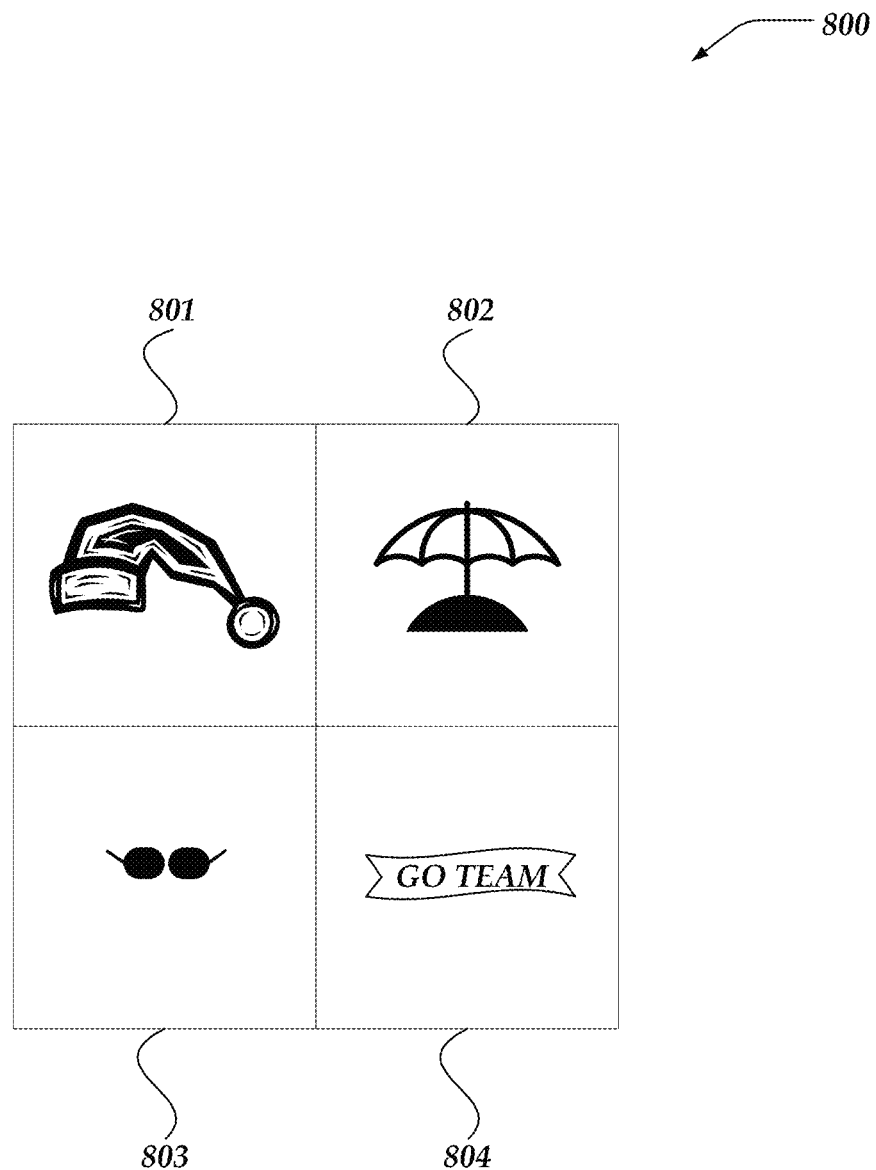
FIG. 8 shows a non-exhaustive example of a use case of an embodiment of a set of emoticon attributes.
Figure 9:
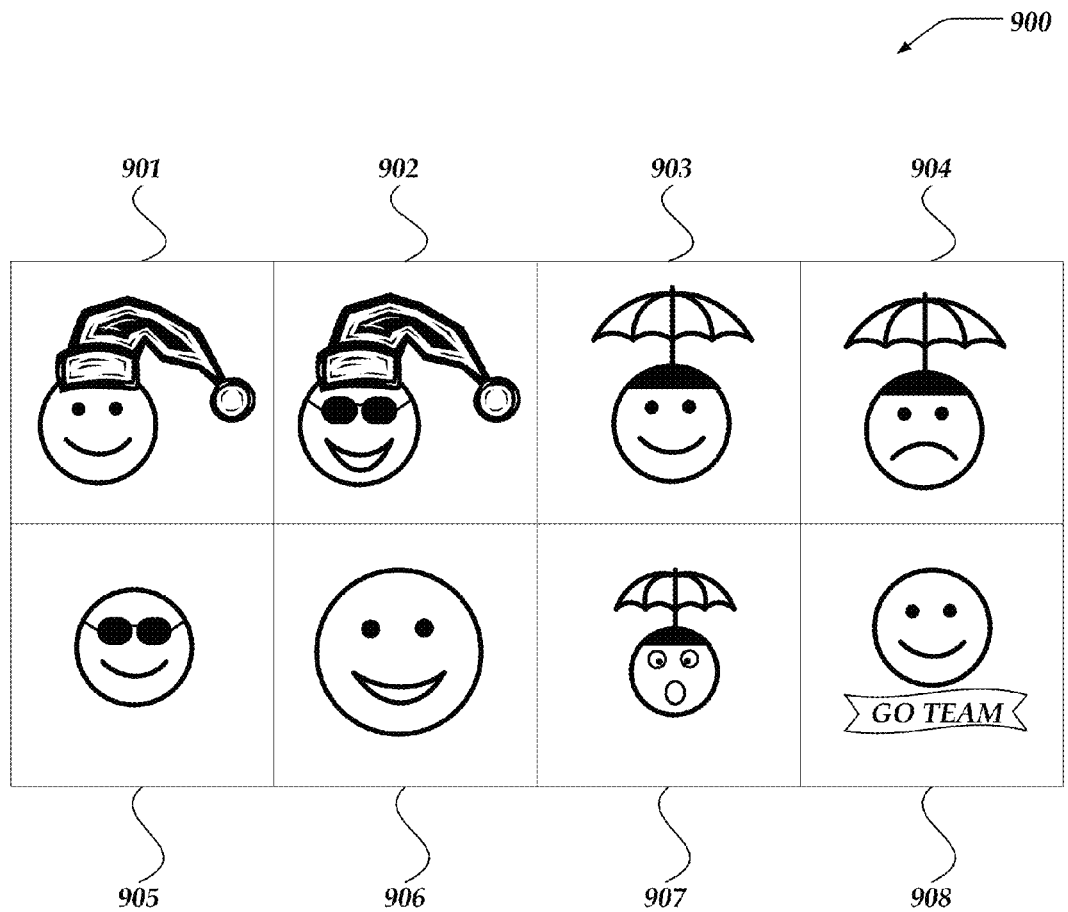
FIG. 9 shows a non-exhaustive example of a use case of an embodiment of a dynamically updated emoticon pool.

FIGS. 7-9 illustrate one non-limiting and non-exhaustive example of an embodiment that depicts an updated emoticon pool (shown in FIG. 9) by adding emoticon attributes (shown in FIG. 8) to base emoticons (shown in FIG. 7). Although FIGS. 7-9 illustrate one embodiment of updating an emoticon pool of a user, the invention is not so limited. Rather, these examples are intended to illustrate one approach to updating an emoticon pool, and should not be considered as exhaustive or limiting. Moreover, as described above, other embodiments may be employed to update the emoticon pool of the user, such as, for example, by selecting a subset of a base emoticon pool. Additionally, FIGS. 7-9 primarily illustrate smiley emoticons, which is not to be construed as limiting or exhaustive; rather, other emoticons known to those skilled in the art may also be employed.

FIG. 7 shows one non-exhaustive and non-limiting example of a base emoticon. Base emoticon pool 700 may be a subset of emoticon pool 210 of FIG. 2 and/or emoticon pool 310 of FIG. 3. Base emoticon pool 700, as illustrated, includes base emoticons 701-706, where: base emoticon 701 is a happy emoticon; base emoticon 702 is a sad emoticon; base emoticon 703 is a spiky hair emoticon; base emoticon 704 is an excited emoticon; base emoticon 705 is a sleeping emoticon; and base emoticon 705 is a flabbergasted emoticon. As noted above, it should be understood that base emoticons 701-706 are examples, and are not intended to be an exhaustive list of base emoticons; rather, other types, shapes, sizes, numbers, or the like of base emoticons may be included in base emoticon pool 700.

FIG. 8 shows one non-exhaustive and non-limiting example of an emoticon attribute pool. Emoticon attribute pool 800 may be an embodiment of emoticon attributes 212 of FIG. 2 and/or emoticon attributes 312 of FIG. 3. As illustrated, emoticon attribute pool 800 includes emoticon attributes 801-804, where: emoticon attribute 801 depicts a Santa Claus hat; emoticon attribute 802 depicts an umbrella hat; emoticon attribute 803 depicts a pair of sunglasses; and emoticon attribute 804 depicts a banner. As noted above, it should be understood that emoticon attributes 801-804 are examples, and are not intended to be an exhaustive list of emoticon attributes; rather, other types, shapes, sizes, numbers, or the like of emoticon attributes may be included in emoticon attribute pool 800.

In one embodiment, each of emoticon attributes 801-804 may be associated with a particular current personal construct. For example, emoticon attribute 801 may be utilized if the user's current personal construct indicates that it is Christmas, Christmas time, the user is at a Christmas party, the user recently purchased Christmas gifts, or the like. Emoticon attribute 802 may be utilized if the user's current personal construct indicates that it is raining at the user's physical location, the user is in a silly mood, or the like. Emoticon attribute 803 may be utilized if the user's current personal construct indicates that it is sunny and the user's physical location, the user is at the beach, the user recently purchased a new pair of sunglasses, or the like. Emoticon attribute 804 may be utilized if the user's current personal construct indicates that the user's favorite sports team is currently playing, the user recently visited a homepage of the user's favorite sports team, or the like. Again, emoticon attributes 801-804 are non-exhaustive and non-limiting examples. Similarly, the example current personal construct associated with emoticon attributes 801-804 are also non-exhaustive and non-limiting examples, and other current personal constructs may be utilized.

FIG. 9 shows one non-exhaustive and non-limiting example of a dynamically updated emoticon pool. Dynamically updated emoticon pool 900 may include personal construct emoticons 901-908. Dynamically updated emoticon pool 900 may be generated by modifying an appearance of one or more base emoticons (e.g. base emoticons 701-706 of FIG. 7) by adding one or more emoticon attributes (e.g. emoticon attributes 801-804 of FIG. 8) to the one or more base emoticons. In this example, a user's current personal construct (e.g. as determined at block 504 of FIG. 5) may indicates that it is Christmas, the user recently bought a new pair of sunglasses, it is raining at the user's physical location, the user's favorite sports team is currently playing, and the user's mood is happy. However, it should be understood that other information may be indicated by the current personal construct, which, in some embodiments, may depend on the user targeted information utilized to determine the current personal construct, as described in more detail above.

Personal construct emoticon 901 may be generated based on the user's current personal construct that indicates that it is Christmas. Personal construct emoticon 901 may be generated by selecting base emoticon 701 of FIG. 7 (e.g. as described at block 602 of FIG. 6) and adding emoticon attribute 801 of FIG. 8 to base emoticon 701 (e.g. as described at block 604 of FIG. 6).

Personal construct emoticon 902 may be generated based on the user's current personal construct that indicates that it is Christmas, the user bought a new pair of sunglasses, and the user's mood is happy. Personal construct emoticon 902 may be generated by selecting base emoticon 704 of FIG. 7 and adding emoticon attributes 801 and 803 of FIG. 8 to base emoticon 704.

Personal construct emoticon 903 may be generated based on the user's current personal construct that indicates that it is raining at the user's physical location and the user's mood is happy. Personal construct emoticon 903 may be generated by selecting base emoticon 701 of FIG. 7 and adding emoticon attribute 802 of FIG. 8 to base emoticon 701.

Personal construct emoticon 904 may be generated based on the user's current personal construct that indicates that it is raining at the user's physical location. Personal construct emoticon 904 may be generated by selecting base emoticon 702 of FIG. 7 and adding emoticon attribute 802 of FIG. 8 to base emoticon 702.

Personal construct emoticon 905 may be generated based on the user's current personal construct that indicates that the user bought a new pair of sunglasses. Personal construct emoticon 905 may be generated by selecting base emoticon 701 of FIG. 7 and adding emoticon attribute 803 of FIG. 8 to base emoticon 701.

Personal construct emoticon 906 may be generated based on the user's current personal construct that indicates that the user's mood is happy. Personal construct emoticon 906 may be generated by selecting base emoticon 704 of FIG. 7 and modifying a feature of base emoticon 704, such as increasing a size of base emoticon 704.

Personal construct emoticon 907 may be generated based on the user's current personal construct that indicates that it is raining at the user's physical location on Christmas. Personal construct emoticon 907 may be generated by selecting base emoticon 706 of FIG. 7, modifying a feature of base emoticon 704, such as decreasing a size of base emoticon 704, and adding emoticon attribute 802 of FIG. 8 to base emoticon.

Personal construct emoticon 908 may be generated based on the user's current personal construct that indicates that the user's favorite sports team is playing. Personal construct emoticon 908 may be generated by selecting base emoticon 701 of FIG. 7 and adding emoticon attribute 804 of FIG. 8 to base emoticon 701. In some embodiments, the text "GO TEAM" may be replaced with virtually any other text, such as the name of a user's favorite sports team, a brand name, company slogan, happy birthday text, or any other text suitable for the user's current personal construct.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method operating on one or more network devices, comprising:
   obtaining, by a processor, user targeted information associated with a user of a client device;
   examining, by the processor, the user targeted information to determine a current personal construct of the user;
   modifying, by the processor, an appearance of one or more base emoticons from a base emoticon pool of the user based on the user's current personal construct;
   dynamically updating, by the processor, an emoticon pool of the user to comprise the modified base emoticons, the user's emoticon pool including a plurality of emoticons that are based on the user's current personal construct;
   providing, by the processor, the updated emoticon pool comprising the plurality of emoticons that are based on the user's current personal construct to the user's client device to enable the user, in composing a message, to select an emoticon from the plurality of emoticons of the user's updated emoticon pool and to send the emoticon that is based on the current personal construct of the user that selected the emoticon in the message composed by the user to a number of other users; and
   transmitting, via the processor, the message composed by the user and including the emoticon selected from the updated emoticon pool by the user as composer of the message to the number of other users.

2. The method of claim 1, wherein the user targeted information includes at least one of static user information, dynamic user information, implicit user information, or dynamic external information.

3. The method of claim 1, wherein dynamically updating the emoticon pool of the user further comprises:
   modifying, by the processor, an appearance of one or more of the plurality of emoticons in the emoticon pool of the user.

4. The method of claim 1, wherein dynamically updating the emoticon pool of the user further comprises:
   selecting, by the processor, a subset of base emoticons from a base emoticon pool; and
   augmenting, by the processor, the emoticon pool of the user to include the selected subset of base emoticons.

5. The method of claim 1, wherein dynamically updating the emoticon pool of the user is further based on user feedback of a previously updated emoticon pool.

6. The method of claim 1, wherein the emoticon pool of the user is dynamically updated in real-time based on real-time changes to the user's current personal construct.

7. The method of claim 1, wherein the user's current personal construct is dynamically updated in real-time based on real-time changes to the user targeted information.

8. A network device comprising:
   a transceiver for communicating with at least one client device over a network;
   a processor; and
   a storage medium for tangibly storing thereon program logic for execution by the processor, the stored program logic comprising:
   receiving logic executed by the processor for receiving user targeted information, including dynamic external information, about a user of a client device;
   examining logic executed by the processor for examining the user targeted information to determine a current personal construct of the user;
   modifying logic executed by the processor for modifying an appearance of one or more base emoticons from a base emoticon pool of the user based on the user's current personal construct;
   updating logic executed by the processor for dynamically updating, an emoticon pool of the user to comprise the modified base emoticons, the user's emoticon pool including a plurality of emoticons that are based on the user's current personal construct;
   displaying logic executed by the processor for displaying the updated emoticon pool comprising the plurality of emoticons that are based on the user's current personal construct to the user to enable the user, in composing a message, to select an emoticon from the plurality of emoticons of the user's updated emoticon pool and to send the emoticon that is based on the current personal construct of the user that selected the emoticon in the message composed by the user to a number of other users
   transmitting logic executed by the processor for transmitting the message composed by the user and including the emoticon selected from the updated emoticon pool by the user as composer of the message to the number of other users.

9. The network device of claim 8, wherein the user targeted information further includes at least one of static user information, dynamic user information, or implicit user information.

10. The network device of claim 8, the modifying logic executed by the processor for modifying an appearance of one or more base emoticons further comprising:
    selecting logic executed by the processor for selecting one or more emoticon attributes based on the user's current personal construct; and
    augmenting logic executed by the processor for augmenting the one or more base emoticons with the selected one or more emoticon attributes.

11. The network device of claim 8, the modifying logic executed by the processor for modifying an appearance of one or more base emoticons further comprising:
    modifying logic executed by the processor for modifying a feature of the one or more base emoticon based on the user's current personal construct.

12. The network device of claim 8, the updating logic executed by the processor for dynamically updating the emoticon pool of the user further comprising:

modifying logic executed by the processor for modifying an appearance of one or more of the plurality of emoticons in the emoticon pool of the user.

13. The network device of claim 8, the updating logic executed by the processor for dynamically updating the emoticon pool of the user further comprising:
  selecting logic executed by the processor for selecting a subset of base emoticons from a base emoticon pool; and
  replacing logic executed by the processor for replacing the emoticon pool of the user with the selected subset of base emoticons.

14. The network device of claim 8, wherein the emoticon pool of the user is dynamically updated in real-time based on real-time changes to the user's current personal construct.

15. The network device of claim 8, wherein the emoticon pool of the user is dynamically updated in real-time based on real-time changes to the user targeted information.

16. A computer-readable non-transitory storage device having computer-executable instructions tangibly stored thereon such that when the storage device is accessed by a computing device, the instructions are executable by the computing device to cause the computing device to perform actions, the actions comprising:
  obtaining user targeted information associated with a user;
  examining the user targeted information to determine a current personal construct of the user;
  modifying an appearance of one or more base emoticons from a base emoticon pool of the user based on the user's current personal construct;
  dynamically updating one or more emoticon pools of the user to comprise the modified base emoticons, each of the user's one or more emoticon pools including a respective plurality of emoticons that are based on the user's current personal construct;
  selectively displaying the one or more emoticons pools, each of which comprising its respective plurality of emoticons that are based on the user's current personal construct, to the user to enable the user, in composing a message, to select an emoticon from at least one of the one or more emoticon pools and to send the emoticon that is based on the current personal construct of the user that selected the emoticon in the message composed by the user to a number of other users; and
  transmitting the message composed by the user and including the emoticon selected from the updated emoticon pool by the user as composer of the message to the number of other users.

17. The computer-readable storage device of claim 16, wherein each of the one or more emoticon pools is dynamically updated based on a subset of the user's current personal construct.

18. The computer-readable storage device of claim 16, wherein the user targeted information includes dynamic external information and dynamic user information.

\* \* \* \* \*